United States Patent [19]

Roncato et al.

[11] Patent Number: 5,328,493
[45] Date of Patent: Jul. 12, 1994

[54] APPARATUS FOR MANUFACTURING A GLASS AND ORGANIC COMPOSITE STRAND, INCLUDING A BLOWING DEVICE

[75] Inventors: Giordano Roncato; Robert Fedorowsky, both of Aix Les Bains; Philippe Boissonnat, Barby; Dominique Loubinoux, Chambery, all of France

[73] Assignee: Vetrotex France, Chambery, France

[21] Appl. No.: 852,874

[22] Filed: Mar. 17, 1992

[30] Foreign Application Priority Data

Mar. 19, 1991 [FR] France .................. 91 03274

[51] Int. Cl.⁵ .......................................... C03B 37/02
[52] U.S. Cl. ...................................... 65/1; 65/4.1;
65/4.3; 65/3.44; 156/167; 156/296; 428/374;
57/244; 264/211.12; 264/174; 264/171
[58] Field of Search .............. 65/1, 4.1, 4.3, 3.44;
156/167, 296; 264/174, 211.12, 171; 57/249,
244; 428/374

[56] References Cited

U.S. PATENT DOCUMENTS

| 3,135,811 | 11/1961 | Barnett . | |
|---|---|---|---|
| 3,222,149 | 12/1965 | Drummond | 156/167 |
| 3,259,681 | 4/1963 | Bull . | |
| 3,276,931 | 10/1966 | Rees | 57/244 |
| 3,969,462 | 7/1976 | Stofan | 264/237 |
| 5,011,523 | 4/1991 | Roncato | 65/4.3 |

FOREIGN PATENT DOCUMENTS 2001694 4/1990 Canada .

*Primary Examiner*—W. Gary Jones
*Assistant Examiner*—John Hoffmann
*Attorney, Agent, or Firm*—Pennie & Edmonds

[57] ABSTRACT

Drawing, from a first installation, organic filaments in the form of one or more layers which converge toward a same point, and drawing, from a second installation, glass filaments which are joined together to form at least one strand. Guiding structure is provided to laterally introduce the glass strand into the area defined by the organic filaments before it is combined with the filaments at their point of convergence. A blowing device (48, 36) is also provided either outside or inside the area defined by the organic fibers.

2 Claims, 2 Drawing Sheets

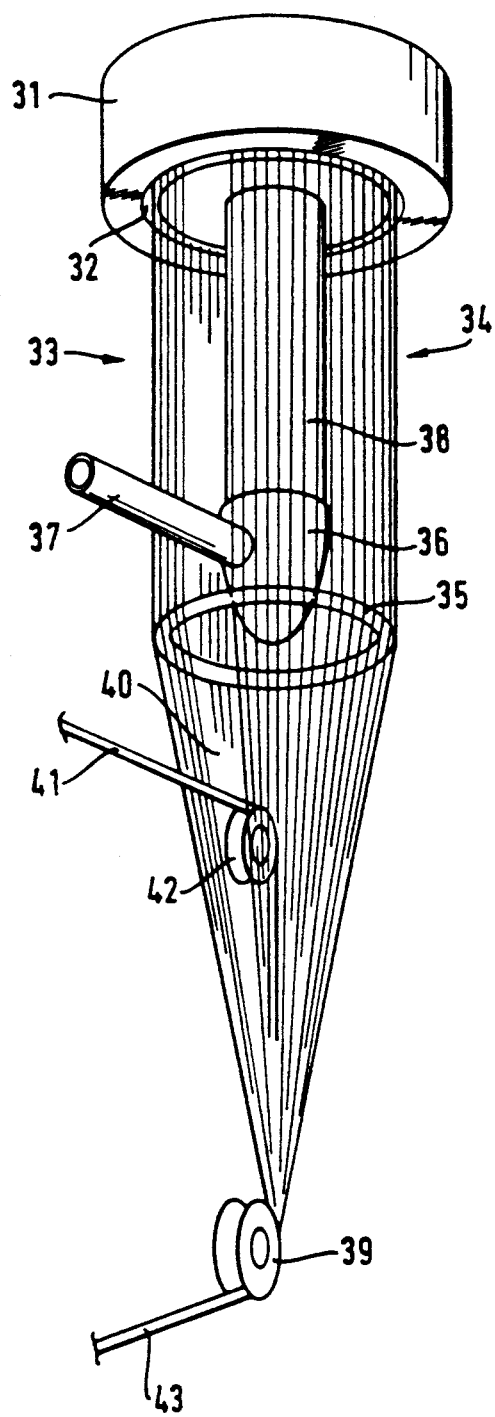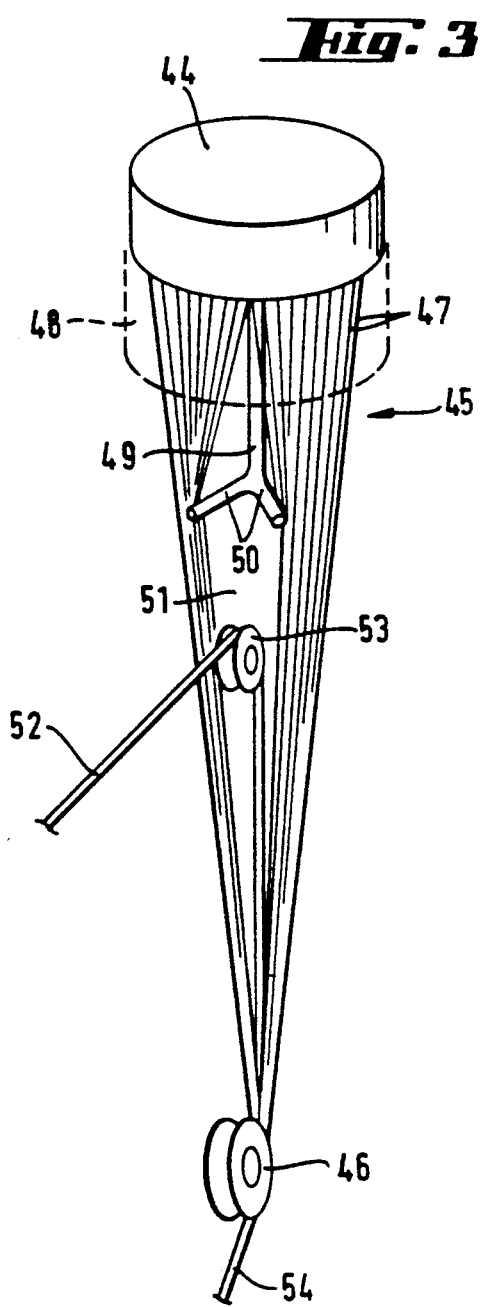

APPARATUS FOR MANUFACTURING A GLASS AND ORGANIC COMPOSITE STRAND, INCLUDING A BLOWING DEVICE

BACKGROUND OF THE INVENTION

The invention relates to a process and an apparatus for manufacturing a composite strand formed by the combination of a plurality of continuous filaments of glass and continuous filaments of an organic thermoplastic material.

More specifically, the invention relates to a process, and to an apparatus for its implementation, wherein continuous filaments of glass and of an organic thermoplastic material are drawn from these two materials in the molten state and wherein these different filaments are combined to form a composite strand.

A process for manufacturing a composite strand according to this principle is known, and has been disclosed in U.S. Pat. No. 5,011,523. This patent describes installations comprising a die, from which continuous glass filaments are drawn, and a drawing head, which is supplied under pressure with an organic thermoplastic material, thereby producing continuous organic filaments. These different filaments, in the form of layers, or layers and strands, are combined in various ways to form a composite strand.

The '523 patent proposes an advantageous embodiment that consists of surrounding the glass filaments or the strand with the organic filaments at the time they are combined. The composite strand produced in this manner displays an advantage in that it prevents, or at the very least restricts, the friction of the glass filaments on the solid surfaces with which it comes into contact.

According to the '523 patent, this embodiment requires the implementation of an annular drawing head with a center opening through which the glass strand or filaments pass. From the description in the patent, this type of composite strand can be produced only by using a special installation.

SUMMARY OF THE INVENTION

The object of the present invention is therefore a process for manufacturing a composite strand, formed of one or more strands of glass surrounded by organic filaments, and which is independent of the configuration of the drawing head that is used to produce the organic filaments.

More particularly, the object of this invention is a process for manufacturing such a composite strand, by using drawing heads such as those ordinarily employed in the synthetic fibers industry.

These objects are accomplished by using a process wherein continuous filaments of glass and of organic thermoplastic material are first drawn from these two materials in their molten state. In particular, the organic filaments are produced by the drawing material that is extruded through the orifices in the die plate of one or more drawing heads, and these different filaments are then combined to form a composite strand. One or more layers of organic filaments are drawn such that they converge toward the same point, and delimit all or part of the periphery of an area falling within the plane which passes through the die plate and the point of convergence. The glass filaments, after having been combined into at least one strand, are laterally introduced into the mentioned area through a passage separating two layers or through a passage opened within a layer, and the strand is then combined with the organic filaments at the point of convergence.

The path of the organic filaments may be deflected by a guiding device placed between the die plate of the drawing head or heads and the point of convergence. The shape of the area delimited by the organic filaments will depend on the shape of the die plate and/or on the number of drawing heads associated therewith, as well as on the shape of the guiding device.

In one of the simplest embodiments, which does not comprise a guiding device, the filaments are drawn such that they form one or more layers which define all or part of the periphery of an area that is conical or pyramidal in shape. Thus, the organic filaments may be drawn from several groups of aligned orifices, so as to form several layers delimiting an area that is pyramidal in shape. This area may comprise an opening along one of its sides, through which the glass strand will be introduced. These layers may be produced by several die plates that are rectangular in shape, for example.

The organic filaments may also be drawn from a plurality of orifices that are distributed over a series of concentric rings or over one or more sections of concentric rings associated with one or more drawing heads. The organic filaments are then drawn into one or more layers delimiting an area that is conical in shape.

This area may comprise an open segment between two layers issuing from two sections of annular die plates, or in a layer issuing from an annular die plate which is devoid of orifices over a part of its surface. The glass strand will be introduced into the conical area through this segment.

In the case the periphery of the area is completely delimited by the organic filaments, for example, if the drawing head comprises an annular die plate which is perforated with orifices over its entire surface, the path of several of the said filaments is deflected so as to allow the glass strand to pass through the layer of organic filaments.

BRIEF DESCRIPTION OF THE DRAWINGS

The invention shall be more clearly explained by the detailed description which follows, and which is illustrated by the accompanying drawings, wherein:

FIG. 2 is a schematic view representing a part of the apparatus illustrated in FIG. 1; and FIG. 3 is a partial schematic view of another embodiment of the invention.

Figure 1:
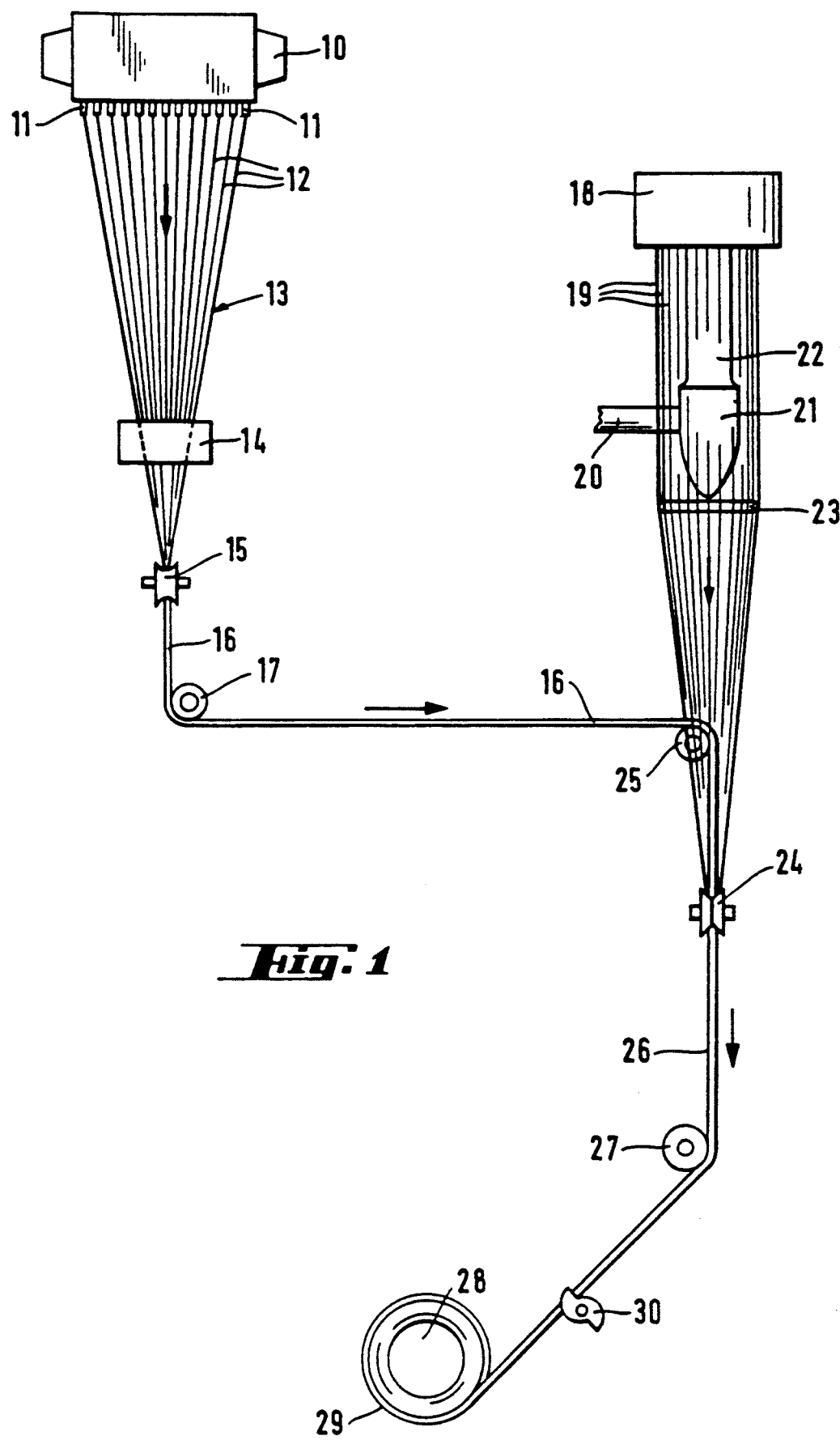
FIG. 1 is an overall schematic view of an apparatus for implementing the invention.

The invention depicted in FIG. 1 comprises a schematically illustrated die 10, which is ordinarily connected to a source that supplies glass. This source, which is not illustrated in the figure, may be the front part of a furnace that dispenses the molten glass to several dies, which are similar to the die 10, by means of simple gravity feed. The die 10 may be supplied with cold glass, which may be produced in the form of marbles that are stored in a hopper situated above the die.

The die 10 is generally made of a platinum-rhodium alloy and heated by Joule effect. Such a die makes it possible to melt the glass or to keep it at a temperature that is adequate to attain a viscosity level suitable for drawing it into continuous filaments. The molten glass flows through a plurality of orifices, such as tips 11, and is immediately drawn into a plurality of filaments 12, which are gathered here in a single layer 13.

This layer 13 comes into contact with the device which is schematically illustrated in 14, such that each filament 12 is coated with a lubricant or a size. This device 14 is ordinarily composed of a vat that is continuously supplied by a bath of lubricant or size, and in which the lower part of a rotating roller is immersed. This roller is continuously coated with a film of lubricant or size which is applied to the filaments 12 as they glide over the surface of the roller.

The layer 13 converges toward the assembly device 15 where the different filaments are joined together to produce a strand 16. This device may be formed as a simple grooved pulley or as a notched plate. After passing over a guiding component 17, such as, for example, a grooved pulley or rod, the strand 16 is conveyed to the other section of the apparatus.

This section comprises a drawing head 18, which is commonly employed to produce synthetic filaments by extrusion of an organic thermoplastic material. The head 18 is cylindrical in shape, and its base is equipped with an annular die plate, which is perforated with a plurality of orifices. This drawing head is connected to an extruding machine (not shown) that feeds molten thermoplastic polymer into it under pressure. The material extruded through the orifices of the head 18 is immediately drawn into a plurality of filaments 19.

The filaments 19 are cooled as soon as they are formed, by a blowing device which is also known. It comprises a source for supplying gaseous fluid, by way of a fan (not shown) and which is connected by a conduit 20 to the base 21 of the cooling device which is situated in the vertical centerline of the head 16. The base 21 of the device receives the gaseous fluid and channels it to the top part 22 of the device. This part is cylindrical in shape and is externally delimited by a wall whose structure ensures a regular, radial distribution of gaseous fluid toward the filaments 19. This wall is advantageously composed of one or more layers of a metallic cloth or porous material. Such a cooling device is described, for example, in U.S. Pat. Nos. 3,135,811, 3,259,681, and 3,969,462. In the embodiment depicted in FIG. 1, the filaments 19 are stabilized by a guiding device 23, before they are gathered by an assembly device 24, which is similar to the device 15.

The glass strand 16 is guided through the organic filaments 19 by a component 25, which is similar to the guiding component 17. The strand 16 comes into contact with the filaments 19 at the assembly device 24. The composite strand 26, which is formed of the glass strand surrounded by organic filaments, is produced down the line from the device 24. After it passes over a guiding component, such as wheel 27, the strand 26 is wound around a spindle 28, which is driven by a motor mounted on a frame (motor and frame not shown). The strand 26 is wound in the form of a spool 29 by a distribution component 30 that guides the said strand along the surface of the spindle in a back-and-forth motion.

In the embodiment depicted, the spindle 28 is the component that serves as the means of pulling the filaments and the organic filaments.

FIG. 2 is a more detailed view of the drawing head and the means implemented to combine the organic filaments and the glass strand, which are schematically illustrated in FIG. 1. There, the drawing head 31, which is cylindrical in shape, is equipped at its base with an annular die plate 32. This plate comprises two sets of orifices distributed over two sections of the annular area. In each of these sections, the orifices are arranged in concentric arcs.

The material extruded through these orifices is immediately drawn into the form of two separate layers of filaments 33, 34, which are stabilized by the guide ring 35. These layers are cooled by the blowing device installed under the head 31, in its vertical centerline. Air is supplied to this device through its base 36 via the conduit 37, and is then distributed radially through the exterior wall of the cylindrical column 38. The layers 33, 34 are then gathered into a single strand by the wheel 39.

The layers 33 and 34 delimit part of the periphery of an area lying between the base of the head 31 and the wheel 39. In the embodiment illustrated in FIG. 2, this area is cylindrical between the head 31 and the ring 35, then becomes conical between the ring and the wheel 39. This area is open along its entire length in two different places, that is, at the open segment 40 in the conical section of the said area and diametrically opposite segment 40.

The glass strand 41, which is conveyed in a direction that is substantially perpendicular to the vertical centerline of the drawing head 31, passes over the pulley 42, then over the wheel 39 where it comes into contact with the filaments of layers 33 and 34.

The pulley 42 is positioned inside the conical area, at a depth that may vary. Thus, the path followed by the glass strand between the pulley 42 and the wheel 39 may go from the path that coincides with the vertical centerline of the drawing head 31 to the path situated at the periphery of the area delimited by the organic filaments while they are being drawn. The glass strand 41 may thus be immediately surrounded with organic filaments as soon as it is combined with them at the wheel 39. The composite strand 43 may then be wound around a spindle as described in the foregoing.

It is of course possible to introduce a second glass strand, which is produced by a second die, into the conical area, by guiding it by means of a second pulley, which may be situated above the pulley 42, for example. This glass strand may be introduced either through the same segment 40, or by the segment opposite to it.

In a variation of this embodiment, there is employed a drawing head equipped with an annular die plate, which is perforated over its entire surface, except for one segment of the plate. The layer of organic filaments is open in one area, which is perpendicular to the said segment.

FIG. 3 illustrates a drawing head to which there are associated means other than those described in the foregoing, and which may also be used to implement the invention.

As in FIG. 2, the installation illustrated comprises a drawing head 44, which is cylindrical in shape. In the embodiment of FIG. 3, the drawing head 44 is equipped at its base with an annular die plate perforated with a plurality of orifices over its entire surface.

The organic material extruded through these orifices is immediately drawn into the form of a layer 45 that converges toward a wheel 46 where all of the filaments 47 are gathered.

A cooling device, which is represented by the cylinder 48 shown in dashed lines, is mounted on the base of the drawing head 44. This device is essentially composed of a cylindrical chamber, which is supplied with a cooled gaseous fluid such as air. In the area where the filaments 47 are formed, the inside wall of the chamber displays a plurality of orifices where the air is radially diffused. This wall is advantageously composed of one or more layers of metallic cloth or of a porous material. A cooling device of this type is more specifically disclosed in U.S. Pat. No. 3,299,469. Of course, other devices for blowing outside air toward the area where the organic filaments are formed may also be employed.

In the embodiment illustrated in FIG. 3, the layer 45 delimits the entire periphery of a conical area lying between the die plate of the head 44 and the wheel 46. A bar 49, which is affixed by one of its extremities to the base of the drawing head 44 in its vertical centerline, is equipped at its free end with two rods 50, which are directed toward the layer 45. The purpose of these rods is to divert the path over which a certain number of filaments 47 travel. This creates an aperture 51 within the layer 45. The glass strand 52, which is conveyed in a direction that is substantially perpendicular to the vertical centerline of the drawing head 44, is introduced through the aperture 51 into the conical area externally delimited by the layer 45, and passes over a pulley 53.

As in the embodiment illustrated in FIG. 2, the strand 52 converges with the filaments 47 at the wheel 46, below which the composite strand 54 is produced. As in the preceding example, the glass strand 52 may travel along a path that may extend from the periphery of the area delimited by the organic filaments 47 to the vertical centerline of the head 44, depending on the position in which the pulley 53 is set.

The embodiments described in the foregoing are non limiting examples of the invention. More particularly, it will be possible for those skilled in the art to combine several glass strands issuing from one or more dies and several layers of organic filaments issuing from several drawing heads, without departing from the scope of the invention.

We claim:

1. In an apparatus for implementing the process of manufacturing a composite strand, composed of continuous filaments of glass and of organic thermoplastic material, and comprising at least one die (10), to which glass is supplied by simple gravity feed, and which is heated by Joule effect, and which is perforated at the bottom with a plurality of orifices (11), at lest one device (14) for coating the glass filaments (12), and at least one device (15) for combining said glass filaments into at least one strand (16, 41), at least one drawing head (18, 31), which is cylindrical and equipped with an annular die plate (32) having a vertical centerline and perforated with a plurality of orifices on part of its surface to define at least one drawing head segment devoid of orifices, and which is supplied with molten organic thermoplastic material under pressure and which is associated with a blowing device (22, 38) and from which the organic filaments are drawn along predetermined paths from the orifices of the die plate to form at least one layer of filaments converging along said paths toward a common point of convergence so as to define at lest part of an outer periphery of an area lying between the die plate and the point of convergence, a guiding component (25, 42) for guiding the glass strand or strands (16, 41) through said outer periphery and into said area, an assembly device 24, 39 for assembling the organic filaments and the glass strand or strands together, and a conveying device (28) for conveying the organic filaments and the glass strand for strands through said assembly device, the improvement wherein:
   (a) the orifices are distributed into one or more groups;
   (b) the blowing device (22, 38) is mounted below the drawing head (18, 31) and along its vertical centerline; and
   (c) the guiding component (25, 42) for guiding said glass strand is a pulley situated at least partially within said area and in alignment with the drawing head segment which is devoid of orifices.

2. In an apparatus for implementing the process of manufacturing a composite strand, composed of continuous filaments of glass and of organic thermoplastic material, and comprising at least one die (10), to which glass is supplied by simple gravity feed, and which is heated by joule effect and which is perforated at the bottom with a plurality of orifices (11), at least one device (14) for coating the glass filaments (12), and at least one device (15) for combining said glass filaments into at least one strand (16, 52), at least one drawing head (44), which is supplied with molten organic thermoplastic material under pressure and which is associated with a blowing device (48) and from which the organic filaments are drawn along predetermined paths from a plurality of spaced orifices in a die plate of the at least one drawing head to form at least one layer of filaments converging so as to define at least part of an outer periphery of an area lying between the die plate and the point of convergence, a guiding component (53) for guiding the glass strand or strands (16, 52) through said outer periphery and into said area, an assembly device (46) for assembling the organic filaments and the glass strand or strands together, and a conveying device (28) for conveying the organic filaments and the glass strand or strands through said assembly device, the improvement wherein:
   (a) the at least one drawing head (44) is cylindrical and said die plate is annular and perforated with a plurality of said orifices defining a complete circle;
   (b) the blowing device (48) is cylindrical and is mounted vertically at the periphery of the drawing head and in surrounding relation to the organic filaments being formed;
   (c) a deflecting device (49, 50) is positioned in engagement with some of the organic filaments (47) for deflecting them to define a passage; and
   (d) the guiding component (53) for guiding the glass strand or strands (52) is a pulley situated at least partially within said area and in alignment with the deflecting device and said passage.

* * * * *